United States Patent [19]

Pierret et al.

[11] Patent Number: 5,182,511
[45] Date of Patent: Jan. 26, 1993

[54] DETECTOR CIRCUIT FOR DETECTING A PHASE SIGNAL OF A POLYPHASE ALTERNATOR FOR A BATTERY CHARGE REGULATOR IN A MOTOR VEHICLE, AND UTILIZATION THEREOF

[75] Inventors: Jean-Marie Pierret, Paris; Didier Michel, Queue-en-Brie, both of France

[73] Assignee: Valeo Equipements Electriques Moteur, Creteil, France

[21] Appl. No.: 551,624

[22] Filed: Jul. 11, 1990

[30] Foreign Application Priority Data

Jul. 11, 1989 [FR] France .................. 89 09312

[51] Int. Cl.[5] .............. G01R 31/00; H02J 7/14; H01H 5/20
[52] U.S. Cl. .............. 324/158 MG; 322/99; 340/661; 340/662
[58] Field of Search .............. 324/158 MG; 322/99; 361/33, 47, 44, 20, 21; 340/648, 651, 661-663

[56] References Cited

U.S. PATENT DOCUMENTS

| | | | |
|---|---|---|---|
| 3,785,147 | 1/1974 | Leeson, Jr. | 318/65 |
| 4,241,336 | 12/1980 | Schonken | 340/661 |
| 4,275,344 | 6/1981 | Mori et al. | 322/28 |
| 4,314,193 | 2/1982 | Mortonson | 324/158 MG |
| 4,316,134 | 2/1982 | Balan et al. | 322/99 |
| 4,453,092 | 6/1984 | Joseph | 340/662 |
| 4,503,479 | 3/1985 | Otsuka et al. | 340/661 |
| 4,584,515 | 4/1986 | Edwards . | |
| 4,670,698 | 6/1987 | Fulton et al. | 324/158 MG |
| 4,689,546 | 9/1987 | Stephens | 322/99 |
| 4,879,625 | 11/1989 | Potenzone | 340/662 |
| 4,916,570 | 4/1990 | Dale | 340/661 |

FOREIGN PATENT DOCUMENTS

| | | |
|---|---|---|
| 16569 | 1/1980 | European Pat. Off. . |
| 0053103 | 2/1982 | European Pat. Off. . |
| 0330561 | 3/1989 | European Pat. Off. . |

Primary Examiner—Ernest F. Karlsen
Assistant Examiner—William J. Burns

[57] ABSTRACT

A detector circuit for detecting a phase signal of a polyphase alternator for a battery charge regulator in a motor vehicle. The circuit includes differential signal amplitude discriminator means for discriminating between at least one pair of phase signals delivered by the alternator. The circuit is applicable to multifunction or to dual-purpose battery charge regulators in motor vehicles.

7 Claims, 4 Drawing Sheets

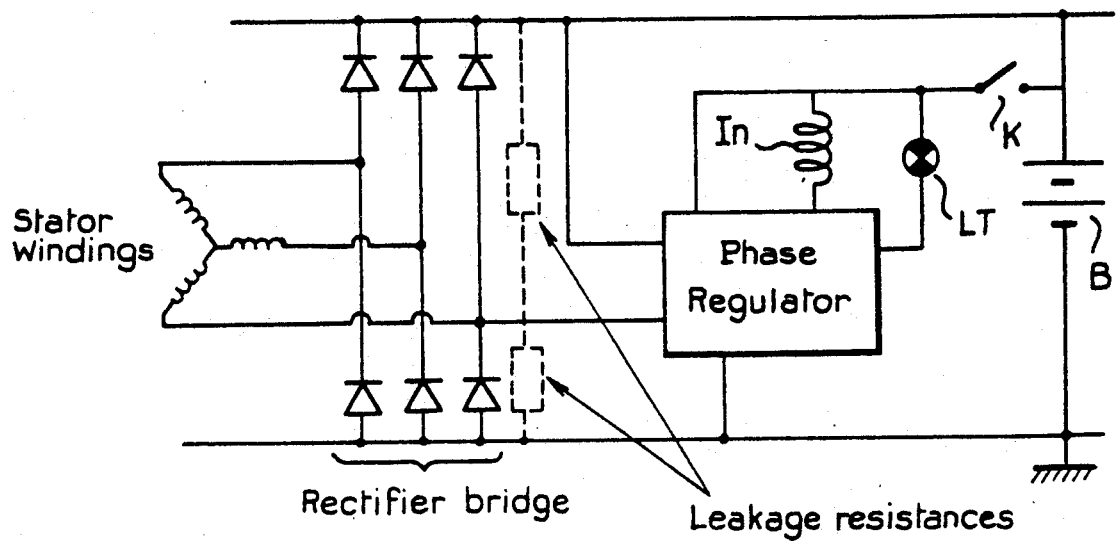
FIG_1a (PRIOR ART)
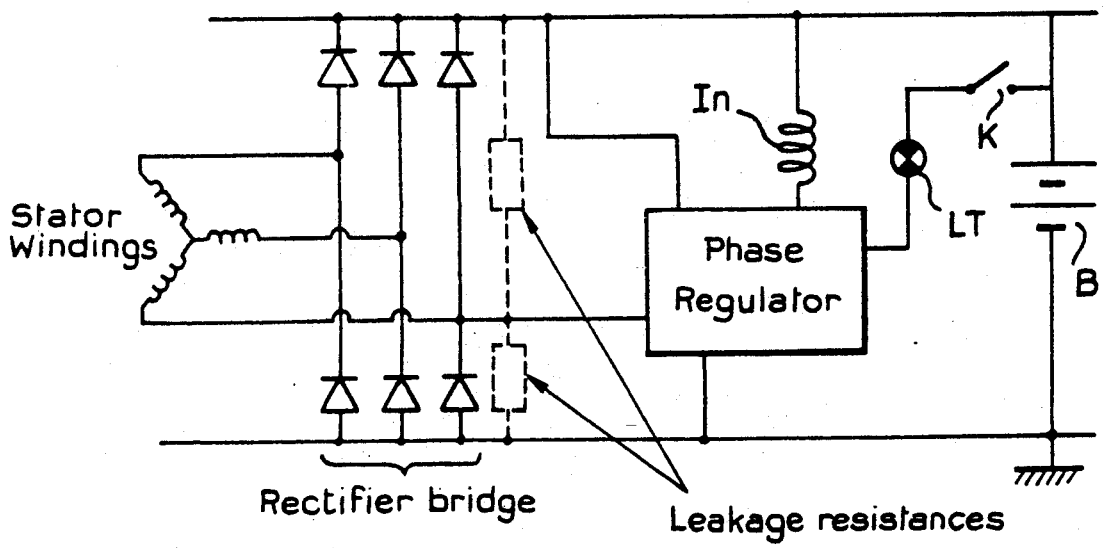
FIG_1b (PRIOR ART)

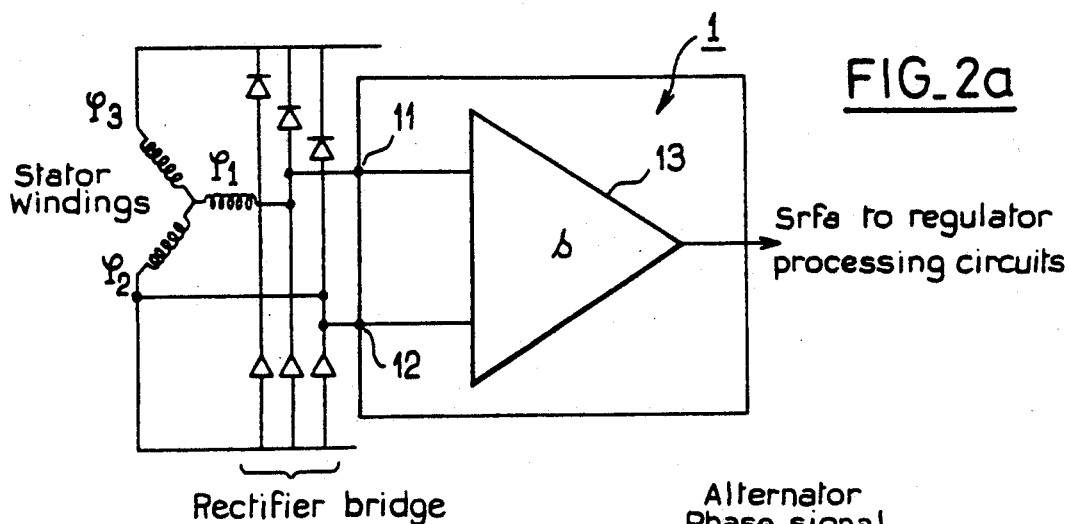
FIG_2a
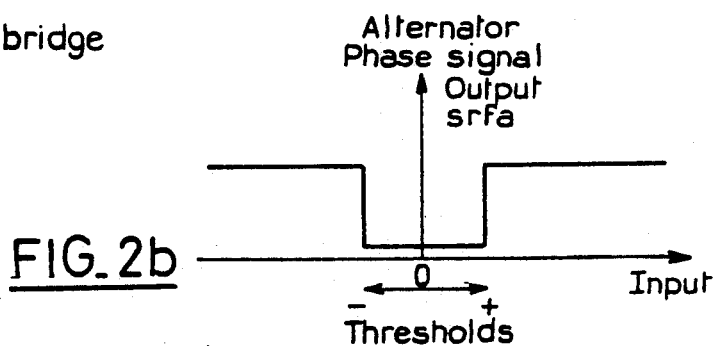
FIG_2b
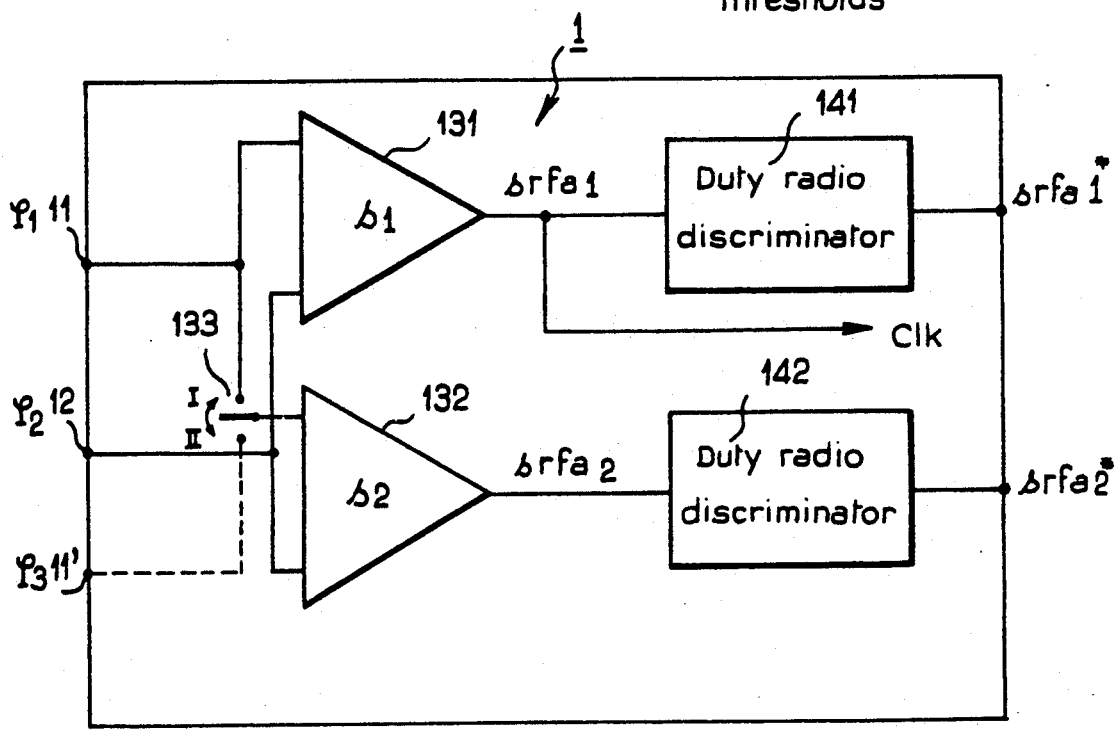
FIG_3

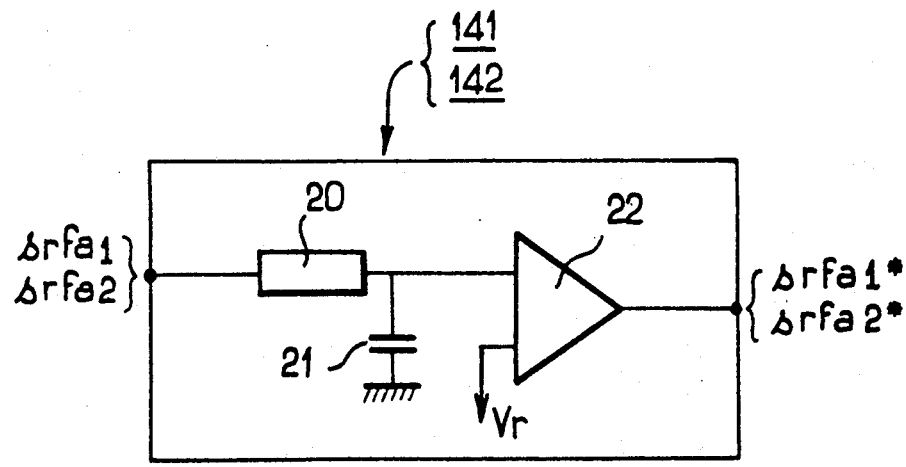
FIG_4a
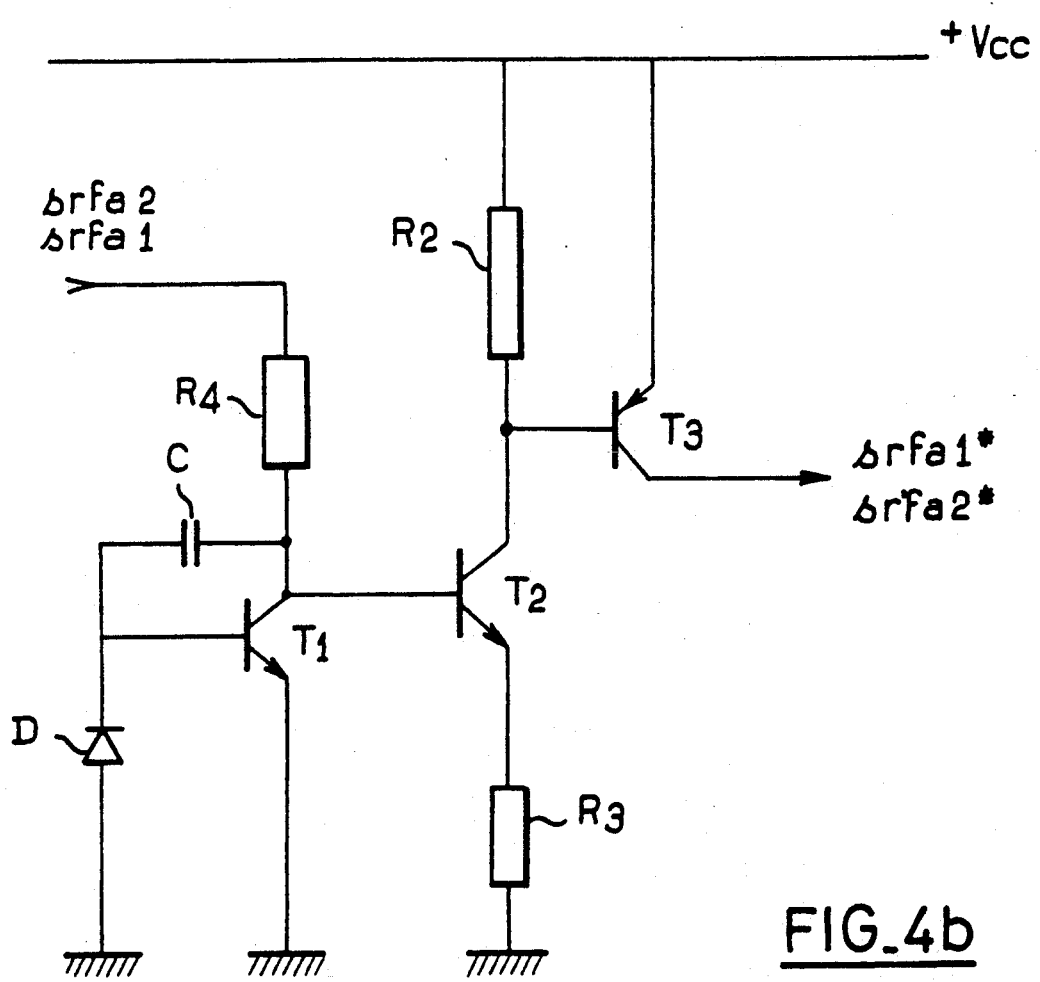
FIG_4b

DETECTOR CIRCUIT FOR DETECTING A PHASE SIGNAL OF A POLYPHASE ALTERNATOR FOR A BATTERY CHARGE REGULATOR IN A MOTOR VEHICLE, AND UTILIZATION THEREOF

BACKGROUND OF THE INVENTION

In motor vehicles, the battery is normally charged from a polyphase alternator, generally a three-phase alternator, feeding a diode rectifier bridge to generate a rectified alternator voltage for charging the battery. The amplitude level of the rectified alternator voltage, or the charging voltage level applied to the battery, is regulated by means of a regulator which regulates the excitation current Ie applied to the rotor of the alternator, and in particular which regulates the duty ratio of the excitation current, on the basis of detecting the alternator phase voltage as delivered by one of the stator windings of the three-phase alternator.

Regulators of this type are well known in the art and give satisfaction under normal conditions of use. They are generally classified as belonging either to a first category of "multifunction" regulators or to a second category of "mono-multifunction" regulators or "dual-purpose" regulators suitable for being used in vehicles which are wired for monofunction regulators or in vehicles which are wired for multifunction regulators.

Wiring diagrams for these types of regulators are given in accompanying FIGS. 1a and 1b. The essential difference between multifunction regulators and dual-purpose regulators, as can be seen from the above-specified figures, results from the need with multifunction regulators to close the vehicle ignition key switch in order to enable the regulator to operate since the rotary field winding of the alternator is fed with excitation current via the ignition key switch.

For a more detailed description of a multifunction type regulator, reference may be made to U.S. Pat. No. 4,584,515 (Edwards) granted Apr. 22, 1986.

Regardless of the category to which regulators may belong, they nevertheless suffer from various operating faults caused by interference voltages or potentials appearing on the windings of the alternator. These interference voltages or potentials may be generated either by equipment belonging to the motor vehicle, e.g. a revolution counter directly connected to the stator windings of the polyphase alternator, or else due to the presence of insulation faults enabling leakage resistances to appear and thus interference bias potentials to appear at the rectifier bridge and at the stator windings, with the leakage resistances being formed, for example, by salt bridges. Such leakage resistances are represented by dashed lines in FIGS. 1a and 1b.

Thus, the above-mentioned leakage resistances and interference potentials may bias the windings of the alternator stator to a value making it appear that the alternator rotating even though the alternator is stationary, and this may be misinterpreted by a regulator connected in conventional manner to the stator windings of a three-phase alternator.

In addition, when the alternator is rotating in the absence of excitation current, as may occur when the vehicle is started, for example, an electromotive force appears at the outputs of the alternator stator windings due to the remanence of the magnetic circuits. This electromotive force as normally detected by a conventional regulator such as shown in FIG. 1a or 1b, serves to indicate that the polyphase alternator is rotating and to enable the regulator to apply excitation current to the rotary field winding of the alternator. The above-mentioned leakage resistances and interference potentials may then have the effect of stabilizing the output voltage from the phase winding which is connected in conventional manner to the regulator, and this may be erroneously interpreted by the regulator as indicating that the alternator is stationary.

With multifunction regulators, a fault in detecting the amplitude of the alternator phase voltage is of minor importance since the regulator operates or not, i.e. regulates the excitation current to the rotary field winding of the alternator, under direct control of the vehicle ignition switch opening or closing, and this is fully under the control of the user.

However, when the same alternator is stationary, and when leakage resistances are present as shown in FIG. 1, then the alternator phase voltage input to the regulator may be biased to a value whose amplitude corresponds to rotation of the alternator. Such a situation can be objectionable if the user happens to close the ignition switch in order to switch on auxiliary circuits in the vehicle, i.e. put the ignition key in an intermediate position provided for that purpose, while the vehicle, its engine, and the alternator are all stationary.

With dual-purpose regulators, leakage resistances and interference potentials may provide erroneous information to the regulator causing it to deliver excitation current to the alternator while the alternator is not rotating, or conversely, failing to trip the regulator once the alternator is in rotation.

The object of the present invention is to remedy the above-mentioned drawbacks by providing a detector circuit for detecting a phase signal of a polyphase alternator for a battery charge regulator in a motor vehicle in which a symmetrical connection relative to the stator windings of the alternator makes it possible to reduce or eliminate interference voltages generated by motor vehicle auxiliary equipment which is directly connected to the stator windings of the alternator.

Another object of the present invention is to provide a detector circuit for detecting a phase signal of a polyphase alternator for a battery charge regulator in a motor vehicle in which the low value of the impedance of the stator windings of the alternator serves to reduce or eliminate the effects of leakage resistances that may form on the rectifier bridge connected to the alternator.

SUMMARY OF THE INVENTION

According to the present invention, a detector circuit for detecting a phase signal of a polyphase alternator for a battery charge regulator in a motor vehicle, is remarkable in that said circuit includes differential signal amplitude discriminator means for discriminating between at least one pair of phase signals delivered by said alternator.

The detector circuit for detecting a phase signal of a polyphase alternator for a battery charge regulator of the present invention is applicable in the vehicle industry for equipping all types of charge regulator, both multifunction and dual-purpose as currently available in the state of the art.

BRIEF DESCRIPTION OF THE DRAWINGS

Embodiments of the invention are described by way of example with reference to the accompanying drawings, in which:

FIGS. 1a and 1b show the prior art;

FIG. 2a is a simplified overall circuit diagram of a circuit of the invention;

FIG. 2a shows a response characteristic of differential discrimination means;

FIG. 3 is a block diagram of an advantageous embodiment of the circuit of the invention;

FIG. 4a shows a first variant of a detail of the FIG. 3 embodiment;

FIG. 4b shows a second variant of a detail of the FIG. 3 embodiment;

DETAILED DESCRIPTION

Figure 5A:
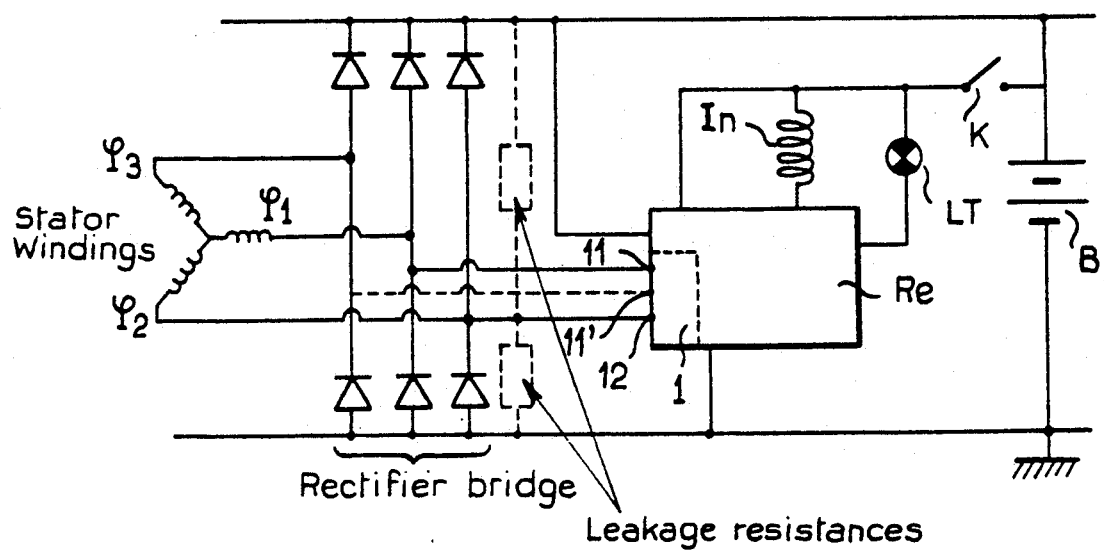
FIG. 5a is a complete wiring diagram for a multifunction regulator provided with a circuit for detecting a phase signal of a polyphase alternator in accordance with the present invention.

A detector circuit for detecting a phase signal of a polyphase alternator for a battery charge regulator in a motor vehicle and in accordance with the present invention is initially described with reference to FIGS. 2a and 2b.

In above-mentioned FIG. 2a, the detector circuit includes differential discrimination means 1 for discriminating between signal amplitudes of at least one pair of phase signals $\phi_1$, $\phi_2$, and $\phi_3$ in FIG. 2 as delivered by the above-mentioned alternator.

FIG. 2a shows the three windings delivering phase signals $\phi_1$, $\phi_2$, and $\phi_3$ to a rectifier bridge constituted in conventional manner by a set of diodes for each of the phases mentioned.

As also shown in FIG. 2a, the detector circuit further includes at least two input terminals 11 and 12 connected respectively to a first phase $\phi_1$ and a second phase $\phi_2$ of the polyphase alternator, each of said inputs thus receiving one of the alternator phases $\phi_1$ and $\phi_2$. In addition, the detector circuit of the invention includes threshold comparator means 13 for generating a signal srfa representative of alternator operating conditions when the differential amplitude $\phi_1 - \phi_2$ in the alternator phase signal is greater than a determined threshold value s.

In conventional manner, the threshold comparator means 13 may be constituted by a differential amplifier type amplifier.

Naturally, given the symmetry of the circuit shown in FIG. 3a and in particular the symmetry of the alternator phase voltages applied to the input terminals 11 and 12 of the circuit shown in FIG. 2, any disturbance or interference bias voltage present on the phases may thus be eliminated or substantially reduced by virtue of the above-mentioned differential discrimination between the pair of phases $\phi_1$ and $\phi_2$.

FIG. 2b is a curve showing a response characteristic for the differential discrimination means 1. In FIG. 2b, the signal srfa is at level 0 whenever the phase signal differential amplitude $\phi_1 - \phi_2$ is less than the threshold value s, and it is at level 1 whenever the phase signal differential amplitude is greater than the threshold value s.

A first advantageous variant of the detector circuit of the invention is described with reference to FIG. 3.

In above-mentioned FIG. 3, the detector circuit of the invention advantageously includes first threshold comparator means 131. The first threshold comparator means has a first threshold value s1 which is no greater than 1/20-th of the nominal battery charge voltage, for example. By way of non-limiting example, for a conventional type of motor vehicle having a nominal battery charge voltage of 12 volts, the threshold value s1 may be taken to be equal to 0.6 volts. This first comparator 131 generates a first signal srfa1 representative of alternator operating conditions corresponding to the alternator rotating at about 1500 revolutions per minute (rpm) in the absence of any alternator excitation current.

In addition, as also shown in FIG. 3, the detector circuit of the invention includes a second threshold comparator means 132 having a second threshold value s2 which is no greater than one-half of the nominal charge voltage of the battery, for example. Under the same conditions as above for a motor vehicle having nominal battery charge voltage of 12 volts, the threshold value s2 may be taken to be equal to 6 or 7 volts. The second comparator circuit 132 generates a second signal srfa2 representative of the alternator operating under conditions where alternator phase voltage is re-regulated.

It will naturally be understood that in the embodiment of FIG. 3, the detector circuit of the invention, when tripped by the first threshold comparator 131, i.e. when the voltage between phases $\phi_1$ and $\phi_2$ exceed about 0.6 volts, serves firstly to generate a signal srfa1 indicating that the alternator has reached its required speed of rotation in the absence of excitation current. This signal may advantageously be used as a synchronous control signal for the regulator as already described in detail in the U.S. and European patents mentioned above.

When the voltage between alternator phases $\phi_1$ and $\phi_2$ reaches the threshold value s2 taken to be equal to 7 volts, for example, the second threshold comparator 132 serves to generate a second signal srfa2 representative, for example, of the alternator operating under conditions where the alternator phase voltage generated by the alternator falls following load shedding, for example, in which case a phase voltage re-regulation step may be applied by the regulator in order to obtain an alternator phase voltage which is again close to the nominal battery charge voltage. Naturally, such regulation is performed in conventional manner by controlling the duty ratio of the alternator excitation current.

In a particularly advantageous embodiment of the detector circuit of the invention, as shown in FIG. 3, the first and second threshold comparator means 131 and 132 are followed by respective circuits 141 and 142 for discriminating the duty ratio of the signal representative of alternator operating conditions.

Naturally, as can be seen from FIG. 3, the first duty ratio discriminator circuit 141 receives the first signal srfa1 representative of alternator operating conditions while the second duty ratio discriminator circuit 142 receives the second signal srfa2 representative of alternator operating conditions.

In a particularly advantageous aspect of the embodiment shown in FIG. 3, the duty ratio discriminator circuit 141 and 142 constitutes a lowpass filter for the corresponding signal srfa1 or srfa2 representative of alternator operating conditions serving to eliminate switching transients about a reference threshold value of the duty ratio. Thus, at a low value of duty ratio corresponding to short duration pulses over the corresponding period, as a function of alternator operating conditions, the above-mentioned circuits serve to eliminate switching transients or pulses which correspond to pulses of switching transients or pulses which correspond to pulses of very short duration.

FIG. 3 shows a particularly advantageous way of connecting the first and second comparator means 131 and 132 to three inputs 11, 12, and 11' for alternator phase signals $\phi_1$, $\phi_2$, and $\phi_3$.

Thus, the two inputs of the first comparator means 131 may be connected to terminals 11 and 12 as described above which receive phase signals $\phi_1$ and $\phi_2$, while the two inputs of the second comparator means 132 may be connected firstly to the terminal 12 receiving the phase signal $\phi_2$ and secondly either to the terminal 11 receiving the phase signal $\phi_1$ or else to the terminal 11' receiving the phase signal $\phi_3$ via a changeover switch 133 capable of taking up two switching positions marked I and II in FIG. 3.

Naturally, it will be understood that when the changeover switch 133 is in switching position I, the first and second comparator means 131 and 132 are both connected to terminals 11 and 12, and they thus both receive phase signals $\phi_1$ and $\phi_2$. In contrast, when the changeover switch 133 is in switching position II, the second comparator means is connected to terminal 12 and to terminal 11', so that the second comparator means 132 thus receives phase signals $\phi_2$ and $\phi_3$.

As a function of the position of the changeover switch 133 it is thus possible to provide differential discrimination in accordance with the invention either between a single pair of phases $\phi_1$ and $\phi_2$, or else between two pairs of phases $\phi_1 - \phi_2$ and $\phi_2 - \phi_3$.

It will naturally be observed that when the alternator is not rotating the windings of the two phases connected in series in this way between the inputs of the comparator means such as the first comparator means 131 or the second comparator means 132 constitute a circuit of very low impedance, having an impedance of about 200 m$\Omega$ (milliohms), thereby enabling interference voltages or signals applied to the inputs of the comparator means to be eliminated by short circuit.

It will naturally be understood that because of the symmetrical connection of the alternator phase windings, connecting the alternator phase voltage inputs symmetrically to the comparators also makes it possible to reduce the effect of the interference voltages when they are of substantially equal values in each of the phases, because of the above-mentioned differential detection.

A more detailed description of the duty ratio discriminator circuit is given with reference to FIG. 4a.

As shown in this figure, each duty ratio discriminator circuit 141 and 142 advantageously comprises a series connection of an integrator type circuit 20, 21 having a long time constant.

In FIG. 4a, the above-mentioned integrator circuit is represented symbolically by a resistance 20 and a capacitance 21. Naturally, the relative values of the resistance 20 and the capacitance 21 are chosen to be sufficiently large to obtain a corresponding time constant which is large relative to the duration of switching transients and the corresponding pulses for short-duration pulses. The input terminal of the above integrator circuit receives the signal representative of alternator operating conditions, i.e. duty ratio discriminator circuit 141 receives the signal srfa1 and the circuit 142 receives the signal srfa2 as respectively delivered by the first and second comparator means 131 and 132 after shaping. The integrator type circuit delivers an integrated signal.

In addition, each duty ratio discriminator circuit includes a threshold comparator 22 receiving the above-mentioned integrated signal on a first input and a reference value Vr on a second input, the reference value representing the threshold duty ratio.

By way of non-limiting example, the reference value Vr may be set to correspond to a duty ratio of 50%.

Advantageously the long time constant integrator type circuit may be constituted by a Miller integrator.

A fuller diagram of the duty ratio discriminator circuit such as 141 and 142 is described with reference to FIG. 4b.

As shown in FIG. 4b, the integrator type circuit 20, 21 may be constituted by a Miller integrator, as mentioned above. This integrator advantageously comprises a transistor T1 constituting an active circuit, e.g. an NPN transistor. This transistor has its emitter electrode connected to the reference voltage of the circuit, namely ground, and its collector electrode connected via a resistor R4 to the input terminal receiving the signal srfa1 or srfa2. The base electrode of transistor T1 is connected to the cathode of a diode D whose anode is connected to ground, with the base electrode also being connected to the collector electrode of the transistor via a capacitor C.

Naturally, as described and mentioned above the signal srfa1 or srfa2 is the signal delivered by the first or second comparator means after shaping. The time constant $\tau$ of the integrator circuit obtained in this way by using the transistor T1 having common emitter mode gain A, the resistor R4 having resistance R, the capacitor C having capacitance C, and the diode D can be written:

$$\tau = R \times A \times C$$

When the signals srfa1 or srfa2 representative of alternator operation have a low duty ratio relative to the time constant $\tau$, the capacitance C cannot charge and the corresponding signal is therefore not transmitted. In contrast, for a larger value of duty ratio, i.e. for a duty ratio of about 50%, the capacitance C has time to charge and the signal srfa1 or srfa2 representative of alternator operation can then be forwarded to the comparator circuit 22.

FIG. 4b shows a particular advantageous embodiment of the comparator 22 which may be constituted by means of two transistors T2 and T3.

As shown in above-mentioned FIG. 4b, the threshold comparator 22 may comprise a first threshold transistor biased by an emitter resistor, said transistor being referenced T2 and its emitter resistor being referenced R3. The transistor T2 (which may advantageously be an NPN type transistor like the transistor T1) has its collector electrode connected to the positive power supply rail +Vcc via a bias resistor R2. An output transistor T3 which is complementary relative to the first and second transistors T1 and T2, i.e. is of the PNP type, constitutes an output stage with the base of the transistor T3 being connected to the collector of transistor T2 and with the emitter of T3 being directly connected to the positive rail +Vcc and its collector serving to deliver a signal srfa1* or srfa2* corresponding to the filtered or duty ratio discriminated signal.

The transistors T1 and T2 are preferably chosen to have the same gain.

It may be observed that the embodiment of FIG. 4b relating to the integrator circuit and the comparator circuit 22 is particularly advantageous insofar as this embodiment is suitable for enabling the entire circuit of the invention to be integrated on the same chip as the regulator circuits.

This therefore provides a particularly advantageous detector circuit for detecting a phase signal of a polyphase alternator for a battery charge regulator in a motor vehicle.

By way of non-limiting example, a conventional type monofunction regulator does not trip until the voltage difference between alternator phases is equal to three diode junction voltages, i.e. about 1.8 volts. This trip threshold is high and means that the rotor needs pre-exciting to trip the regulator at low alternator revolutions as required by vehicle manufacturers.

For a monofunction regulator, the pre-excitation current is delivered via the indicator or fault-warning lamp LT. If the lamp is faulty, e.g. if its filament has broken, then the pre-excitation current does not flow and alternator tripping depends solely on the remanence of the magnetic circuits of the alternator. The revolutions at which the alternator trips then become very high and this is not acceptable for vehicle manufacturers.

With mono-multifunction or dual-purpose regulators, alternator rotation can be detected at a much lower threshold value, e.g. a threshold equal to one junction voltage, i.e. 0.6 volts. The remanence of the alternator magnetic circuit is then sufficient to trip the regulator at low alternator revolutions acceptable to vehicle manufacturers.

Figure 5B:
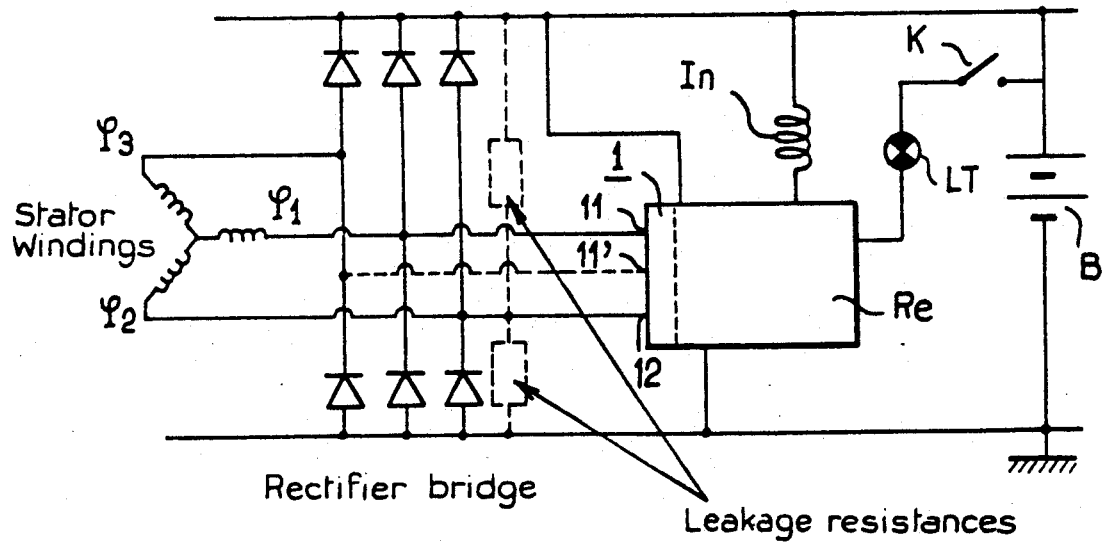
FIG. 5b is a complete wiring diagram for a dual-purpose regulator provided with a circuit for detecting a phase signal of a polyphase alternator in accordance with the present invention.

Naturally, they detector circuit for detecting a phase signal of a polyphase alternator or a battery charge regulator in a motor vehicle and in accordance with the invention may be used either with multifunction type regulators as shown in FIG. 5a or else with dual-purpose type regulators as shown in FIG. 5b.

In both cases when a detector circuit for detecting a phase signal of a polyphase alternator for battery charge regulator in a motor vehicle of the invention is incorporated in the regulator, the only externally visible difference over a prior art regulator lies in the number of phase signal inputs which, instead of being constituted by a single input as in prior art regulators, may include two or three inputs to which one or two pairs of alternator windings are connected so as to deliver one or two pairs of alternator phase signals for the purposes of differential discrimination, as shown in FIGS. 2 and 3 and as described above.

We claim:

1. A detector circuit for detecting a phase signal of a polyphase alternator for a battery charge regulator in a motor vehicle, wherein said circuit includes differential signal amplitude discriminator means for discriminating between at least one pair of phase signals delivered by said alternator, said differential signal amplitude discriminator means including at least:

two input terminals connected respectively to a first and to a second phase of said polyphase alternator, each receiving an alternator phase signal $\phi_1$ or $\phi_2$; and threshold comparator means for generating a signal representative of alternator operating conditions when the alternator phase amplitude differential exceeds a determined threshold value, said threshold comparator means including:

a first threshold comparator means, including a first threshold value no greater than 1/20-th of the nominal charge voltage of the battery enabling a first signal representative of alternator operating conditions to be generated when the alternator is rotating at about 1500 rpm. in the absence of alternator excitation current; and a second threshold comparator means, including a second threshold value no greater than ½ of the nominal battery charge voltage enabling a second signal representative of alternator operating conditions to be generated corresponding to alternator phase voltage regulation conditions.

2. A circuit according to claim 1, wherein said threshold comparator means are constituted by a differential amplifier.

3. A circuit according to claim 1, wherein said first and second threshold comparator means are followed by respective duty ratio discriminator circuits responsive to the duty ratio in each of the signals representative of alternator operating conditions.

4. A circuit according to claim 3, wherein said duty ratio discriminator circuit for said signal representative of alternator operating conditions constitutes a lowpass filter eliminating switching transients relative to a duty ratio threshold reference value.

5. A circuit according to claim 3, wherein each of said duty ratio discriminator circuits comprises a series connection of:

an integrator type circuit having a long time constant and receiving on an input terminal a shaped version of said signal representative of alternator operating conditions, and delivering an integrated signal; and a threshold comparator having a first input receiving the integrated signal delivered by said integrator type circuit, and a second input receiving a voltage reference value representative of said duty reference threshold reference value.

6. A circuit according to claim 5, wherein said integrator type circuit is a Miller integrator.

7. A circuit according to claim 5, wherein said threshold comparator comprises:

a first transistor having a basis threshold set by an emitter resistance, said bias threshold defining said duty ratio threshold reference value, said first transistor receiving said integrated signal on its base electrode; and a second transistor of complementary type relative to said first transistor and constituting an output stage for said comparator, having its base electrode connected to the collector electrode of said first transistor.

* * * * *